Oct. 7, 1941.   F. C. ABBOTT   2,258,310
TREATMENT OF SPENT PICKLE LIQUOR OR THE LIKE
Filed June 12, 1940
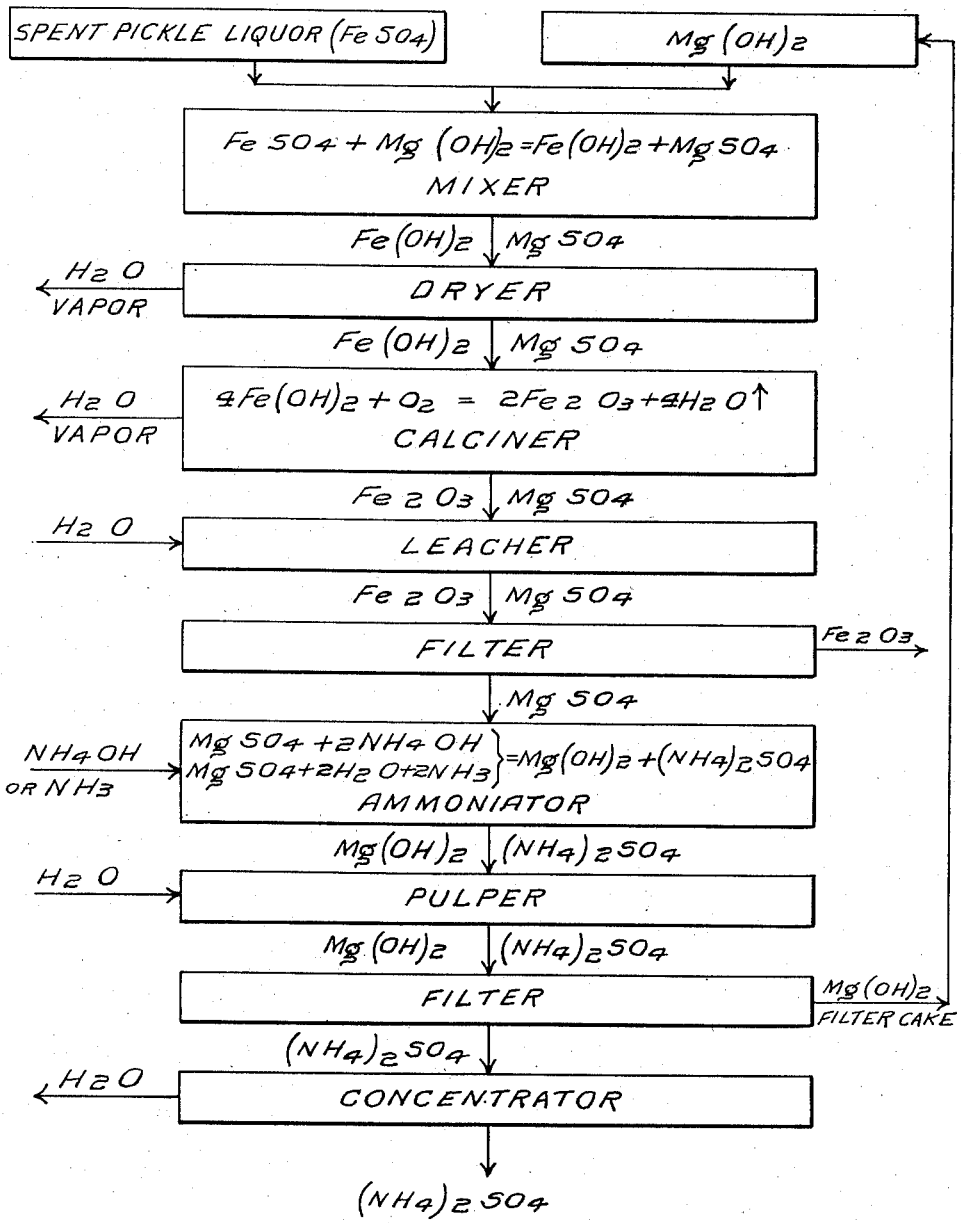
INVENTOR
Frederick C. Abbott Patented Oct. 7, 1941

2,258,310

UNITED STATES PATENT OFFICE 2,258,310

TREATMENT OF SPENT PICKLE LIQUOR OR THE LIKE

Frederick C. Abbott, Tulsa, Okla., assignor to Ozark Chemical Company, Tulsa, Okla., a corporation of Delaware Application June 12, 1940, Serial No. 340,076

2 Claims. (Cl. 23—119)

This invention contemplates the treatment and economically advantageous utilization of certain waste and by-products of iron and steel plants to eliminate the problems incident to disposal of the former and to effect recovery of valuable constituents of both.

It is a usual practice in the iron and steel industry to clean ferrous articles during the course of their manufacture by a process known as "pickling" in which the articles are subjected to the action of a weak solution of sulfuric acid to remove iron oxide scale and other surface contamination. During the pickling the acid reacts with the iron oxide, and sometimes with the base metal itself, to form ferrous sulfate ($FeSO_4$), and when the solution or "pickle liquor" has been used until it is no longer satisfactorily effective because of excessive contamination with dissolved ferrous sulfate and/or foreign substances, it must be disposed of in whole or in part and replaced with fresh solution.

Discharge of the used solution, known as waste or spent pickle liquor, directly into streams or sewers is generally prohibited by law because of its inimical effects on health and vegetation, and as it is produced in large quantities its disposal therefore presents a serious industrial problem.

The liquor is consequently sometimes treated so as to render it innocuous before disposing of it in this way and although such treatments involve considerable expense, the absence of any economically preferable method of disposal has caused them to be widely employed with resultant waste of potentially valuable constituents of the liquor.

In consequence repeated efforts have been made to evolve a satisfactory method of offsetting the expense of disposing of the liquor in an unobjectionable way by recovering therefrom commercially valuable products and to this end extensive research has been and is being carried out. For example, one such method which has been developed comprises neutralizing the excess acid in the liquor with iron and then recovering copperas ($FeSO_4 \cdot 7H_2O$) from the solution by concentration and crystallization, but this product has only a limited market which is incapable of accepting all the copperas which could be produced by this method if it were widely used.

Other methods heretofore suggested have also invariably failed to completely solve the problem but, on the contrary, have usually entailed added expense as compared with the older method of simply throwing away the untreated spent pickle liquor which, as noted, is now generally prohibited by law.

Modern iron and steel plants moreover usually include coke ovens for making the coke used in the blast furnaces, and as by-products these ovens produce large quantities of ammoniacal liquors and/or ammonia bearing gases; the recovery of the ammonia contained therein in a cheap and efficient manner is therefore an essential element in the economic operation of the plant as a whole.

Consequently, my invention, particularly when practised in connection with iron or steel plants thus equipped, is directed primarily to treatment of spent pickle liquor and coordinated utilization of ammonia-bearing coke oven by-products in such a way as to eliminate the necessity of disposing of large quantities of the liquor in its corrosive and poisonous condition and by the recovery of valuable products reduce, or even convert into operating profits, the economic losses heretofore resulting from its production.

More specifically, it is therefore a principal object of the invention to provide a new and useful treatment of spent pickle liquor and ammonia bearing gases or liquors, both normally produced in large quantities incidentally to the operation of iron and steel plants, whereby the necessity for disposing of the spent pickle liquor in its inherently objectionable state is entirely eliminated.

A further object is the provision of a method of conjointly treating spent pickle liquor and ammonia bearing coke oven by-products, whereby the valuable constituents of each may be recovered in commercially desirable form.

A still further object is the provision of a method of treating spent pickle liquors or like ferrous sulfate and sulfuric acid containing solutions with magnesium hydrate to convert their iron and sulfate contents to a form susceptible to subsequent separate extraction in a cheap and simple manner.

Other objects, purposes and advantages of the invention will hereinafter more fully appear or will be understood from the following description of a preferred practice of the method thereof whereby iron oxide and crystalline ammonium sulfate are recovered from spent pickle liquor and ammoniacal coke oven by-products or the like, the sequence of treatments employed being diagrammatically illustrated on the accompanying flow sheet.

While the invention is principally concerned with the treatment of spent pickle liquor containing ferrous sulfate ($FeSO_4$) and ammoniacal coke oven by-products containing ammonium hydroxide ($NH_4OH$) or anhydrous ammonia ($NH_3$) resulting from the operation of iron and steel plants, the sources from which the sulfate and ammonia containing products are derived bear no essential relation to the invention which may therefore be employed with equal facility for the treatment of generally similar products obtained from other sources.

It frequently happens, moreover, that spent pickle liquor and ammoniacal coke oven by-products contain impurities such as inhibitors added to the pickle liquor to control the pickling process, cyanides, cyanates, and sulfates and unless these are removed before, during or after subjection of the liquor and by-products to treatment in accordance with my invention, some or all of them may appear in the ammonium sulfate ultimately recovered and render it less suitable for some commercial uses than it would otherwise be. Therefore, since the presence or absence of these impurities has no appreciable effect upon the practice of the invention and/or the results attained thereby, the purpose for which the ammonium sulfate is to be employed will generally dictate the desirability of removal of some or all of them in any suitable or convenient way.

When discharged from pickling vats as of no further use for pickling, spent pickle liquor generally contains, in addition to impurities as aforesaid, about 12% to 17% ferrous sulfate ($FeSO_4$) and about 2% to 5% free sulfuric acid ($H_2SO_4$). In accordance with the invention this liquor is initially treated, either after or in the absence of removal of impurities, with magnesium hydrate $Mg(OH)_2$ preferably in the form of filter cake containing approximately 40% solid $Mg(OH)_2$ and 60% water or if, as is generally desirable, the filter cake utilized is that recovered at a later point in the practice of the invention, about 60% of an approximately 22.65% water solution of ammonium sulfate ($NH_4)_2SO_4$. The quantity of $Mg(OH)_2$ employed preferably corresponds to a small excess over the chemical equivalent of the $FeSO_4$ and $H_2SO_4$ present in the liquor, and the amount added to a given quantity of the latter will thus depend partly upon the concentration of $FeSO_4$ and/or $H_2SO_4$ in the liquor and partly upon the concentration of $Mg(OH)_2$ in the filter cake; these are not fixed but are dependent upon plant practice. The filter cake may contain an appreciable quantity of ammonium sulfate, however, without impairing the efficiency of the method and in the preferred practice of the invention, as above suggested, filter cake recovered at a later stage in the procedure is used and carries a "recirculating load" of ammonium sulfate which does not participate materially in the subsequent reactions.

The spent pickle liquor and magnesium hydrate, either as filter cake or otherwise, are first thoroughly intermixed by prolonged stirring or by mixing in a ball mill or the like. This mixing, which may be either continuous or in batches, is preferably carried on for at least an hour as to every portion of the ingredients so as to insure their complete intermixture and consequent reaction between the ferrous sulfate and/or sulfuric acid and the magnesium hydrate in accordance with the following equations:

$$FeSO_4 + Mg(OH)_2 = Fe(OH)_2 + MgSO_4 \quad (1)$$
$$H_2SO_4 + Mg(OH)_2 = MgSO_4 + 2H_2O \quad (2)$$

Under the conditions stated these reactions proceed to substantial completion and the viscous slurry so produced is then dried, preferably by transfer to a suitable mechanical dryer in which a material proportion of its moisture content is evaporated by heat.

The solid residue from the dryer is next calcined with the aid of apparatus of the character ordinarily used for calcining generally similar materials, the residue being heated to a temperature of 600° C. to 700° C. (1112° F. to 1292° F.) during this operation which thoroughly dehydrates the material and converts its ferrous hydroxide ($Fe(OH)_2$) content to iron sesqui-oxide ($Fe_2O_3$) in accordance with the following equation:

$$4Fe(OH)_2 + O_2 = 2Fe_2O_3 + 4H_2O \quad (3)$$

The resultant solid, containing the soluble $MgSO_4$ and the insoluble $Fe_2O_3$ is then leached with water, preferably by counter current leaching, to produce a slurry containing the granular and easily filterable $Fe_2O_3$ suspended in a solution of $MgSO_4$, and this slurry is then filtered, the amount of water used in the leaching preferably being controlled to yield a filtrate containing approximately 35% $MgSO_4$. If desired, the $Fe_2O_3$ recovered from this filtration step may be washed with water and the wash water added to the filtrate, and if such washing and addition are practised, it is preferable that the amount of water used therefor be proportioned to the amount used in the leaching so that when the wash water and filtrate are combined the resultant solution will contain magnesium sulfate in about the proportion mentioned as this enables the ultimate production of ammonium sulfate containing less than 0.2% magnesium and of a filter cake containing substantially 99% of the magnesium initially introduced to the circuit.

The material filtered out, especially if it has been washed, consists of substantially pure $Fe_2O_3$ and contains virtually all the iron in the original spent pickle liquor. It therefore may be used for any of the various commercial purposes for which substantially pure $Fe_2O_3$ is adapted, as it approximates in composition extremely high grade iron ore and so may be sintered or briquetted and charged with ore into a blast furnace or employed for making iron oxide paint pigments, polishing rouge or the like.

The filtrate or mixture of filtrate and wash water resulting from the aforesaid operation is treated in suitable apparatus with ammonia bearing gas or with an ammonia bearing liquor, the gas or liquor being preferably derived as a by-product from the operation of the plant coke ovens whereby the ammonia, whether introduced in the anhydrous state ($NH_3$) as a gas, or as the hydrate ($NH_4OH$) in a liquor, reacts with the magnesium sulfate in the filtrate in accordance with either or both of the following equations:

$$MgSO_4 + 2H_2O + 2NH_3 = Mg(OH)_2 + (NH_4)_2SO_4 \quad (4)$$
$$MgSO_4 + 2NH_4OH = Mg(OH)_2 + (NH_4)_2SO_4 \quad (5)$$

This forms a slurry which is then diluted or pulped with water sufficient to reduce its precipitate, which is substantially pure $Mg(OH)_2$, to approximately 10% by weight with consequent dilution of the solution in which it is suspended to a concentration of about 22.65% $(NH_4)_2SO_4$. The precipitated $Mg(OH)_2$ is next removed by filtering, preferably by means of a rotary filter adapted to discharge a magnesium hydrate filter cake containing by weight about 40% $Mg(OH)_2$ in solid form and about 60% of the 22.65% $(NH_4)_2SO_4$ solution.

This filter cake can now be used for treating a further supply of spent pickle liquor as hereinabove described and if it is to be so used it is not essential that the $(NH_4)_2SO_4$ solution it carries be removed as this solution merely forms the recirculating load to which reference has been made. Of course, if desired, the filter cake can be washed to free it of soluble impurities and used for other purposes, but I prefer to practise the method of my invention as a cyclic one by recirculating the $Mg(OH)_2$ through return of the filter cake to the mixer rather than by continuously supplying fresh Mg(OH)₂ at the beginning of the circuit and disposing of a corresponding quantity of it after ammoniating the MgSO₄ produced with its aid. Under these conditions only an initial supply of Mg(OH)₂ is required to put the method into operation for it thereafter continues as a truly cyclic one in which Mg(OH)₂ is produced to replace substantially in full that which was previously used in reaction with the spent pickle liquor, and only relatively small quantities of Mg(OH)₂ need be supplied from time to time to make up for mechanical and manipulation losses.

The filtrate separated from the magnesium hydrate filter cake, comprising a solution containing approximately 22.65% (NH₄)₂SO₄, is preferably transferred to a suitable evaporator or other apparatus and its ammonium sulfate content recoved, desirably in crystalline form, in accordance with any suitable evaporation and/or crystallization method adapted for the purpose.

Tests of the method herein described indicate the reaction of the magnesium hydrate with the ferrous sulfate, and any free sulfuric acid present, proceeds substantially to completion, probably utilizing in excess of 99.9% of the ferrous sulfate and acid available, provided of course that sufficient Mg(OH)₂ is supplied. But even if some FeSO₄ should remain unconverted after the Mg(OH)₂ reaction, it is roasted to iron oxide during the calcining step and is thus recovered as Fe₂O₃ in the subsequent filtration. As previously pointed out, some excess magnesium hydrate beyond theoretical chemical equivalence is preferably supplied, for it is desirable that there be sufficient of it present to prevent release of free sulfuric acid during the calcining operation; the latter therefore is not attended by the production of the obnoxious and corrosive gases which are evolved when substances containing free sulfuric acid are calcined, while the small excess of Mg(OH)₂ not required for reaction and generally lost by occlusion in the Fe₂O₃ recovered is negligible from the standpoint either of the efficiency of the method or the economic utilization of the Fe₂O₃ produced.

The tests referred to moreover indicate that the value of the recovered products may be in some instances substantially in excess of the costs incident to the practice of the method and thus that disposal of the spent pickle liquor in accordance with my invention may return a profit instead of constituting a material expense in iron and steel plant operation as has heretofore been the case. This is emphasized by the fact that I effect the recovery in commercial form of substantially all of the ammonia contained in the ammonia bearing gas and/or liquor utilized in ammoniating the MgSO₄ solution whereby the necessity of purchasing sulfuric acid for neutralizing a corresponding quantity of coke oven ammonia is eliminated and this element of cost of plant operation as a whole therefore proportionately reduced. Obviously, however, the specific practices in a given plant will frequently dictate the practicability of using the entire ammoniacal product of the coke ovens in connection with the disposal of the spent pickle liquor.

A further advantage of my method resides in the fact that neutralization and consequent substantial elimination of the corrosiveness of the spent pickle liquor occurs during the initial step so that the subsequent steps may be practised with ordinary steel equipment without special precautions, such as the provision of corrosion-resistant coatings or the like, to protect it from deterioration under the action of the materials employed, while by utilizing magnesium hydrate in the reaction with the spent pickle liquor and subsequently calcining the slurry without intermediate filtering the difficulties normally encountered in handling, and especially in filtering, ferrous hydroxide, ordinarily a substantially unfilterable colloid, are eliminated.

As above pointed out, the reaction between the ferrous sulfate and magnesium hydrate and subsequent calcining enables the iron content of the spent pickle liquor to be recovered separately as Fe₂O₃, and my method thus accomplishes the production of substantially iron free and therefore relatively high grade ammonium sulfate which may be sold to better advantage for certain purposes than ammonium sulfate produced in accordance with other methods which leave the sulfate colored and appreciably contaminated with material quantities of iron.

Nor does the method involve any intricate reactions, delicate balancing of quantities employed or unduly accurate control of the apparatus with the aid of which the various steps are performed, and its practice is therefore extremely simple and can be carried out at a minimum expense for labor and supervision, while the standard equipment which is used for its performance is relatively inexpensive and does not necessitate a large investment.

While I have herein described with considerable particularity one manner of practicing the invention, it will be understood that I contemplate its use for treating other products generally similar to those herein specifically mentioned and/or derived from other sources, and that changes and modifications in the manner of its performance as well as in the specific chemical reactions incident thereto will readily occur to those skilled in the art and may be made if desired without departing from the spirit and scope of the invention as defined in the appended claims.

Having thus described my invention, I claim and desire to protect by Letters Patent of the United States:

1. A cyclic method of treating spent pickle liquor which comprises mixing magnesium hydrate with the liquor to produce a slurry of iron hydrate and a soluble magnesium salt, calcining the slurry to dehydrate it and oxidize the iron hydrate, dissolving the magnesium salt in water and separating the iron oxide from the magnesium salt solution, ammoniating said solution to precipitate magnesium hydrate, separating the precipitate from the solution and returning it to the circuit with additional spent pickle liquor.

2. A cyclic method of treating spent pickle liquor which comprises mixing magnesium hydrate with the liquor to produce a slurry of iron hydrate and a soluble magnesium salt, calcining the slurry to dehydrate it and oxidize the iron hydrate, dissolving the magnesium salt in water and separating the iron oxide from the magnesium salt solution, ammoniating said solution to precipitate magnesium hydrate, separating the precipitate from the solution and returning it to the circuit with additional spent pickle liquor and recovering ammonium sulfate from the remaining ammoniated solution.

FREDERICK C. ABBOTT.